United States Patent [19]

Hyodo

[11] Patent Number: 5,528,274
[45] Date of Patent: Jun. 18, 1996

[54] METHOD OF PRINTING FULL-COLOR FRAME IMAGE REPRODUCED FROM FULL-COLOR FIELD IMAGE BY INTERPOLATION

[75] Inventor: Manabu Hyodo, Saitama, Japan

[73] Assignee: Fuji Photo Film Co., Ltd., Minami-ashigara, Japan

[21] Appl. No.: 221,771

[22] Filed: Apr. 1, 1994

[30] Foreign Application Priority Data

Apr. 2, 1993 [JP] Japan ........................... 5-076781

[51] Int. Cl.$^6$ .............................. H04N 7/01; H04N 5/91; B41J 2/325
[52] U.S. Cl. ...................... 347/172; 347/175; 358/525
[58] Field of Search .................. 358/525, 298; 347/172, 175

[56] References Cited

U.S. PATENT DOCUMENTS 5,232,294  8/1993  Inui ............................ 358/298

FOREIGN PATENT DOCUMENTS 63-187785  8/1988  Japan .

*Primary Examiner*—Huan H. Tran

[57] ABSTRACT

A color video thermal printing method for printing a full-color frame image on the basis of a color video signal of a full-color field image by interpolation. Interpolation for at least one of three primary colors is made as follows: sums A1, A2 and A3 of image data D1 and D4; D2 and D5; and D3 and D6 of respectively two pixels P1 and P4; P2 and P5; and P3 and P6 are calculated, assuming the pixels P1, P2 and P3 are aligned in this order in a line of the field image, and the pixels P4, P5 and P6 are aligned in this order in an adjacent line of the field image, wherein the pixels P2 and P5 are aligned in the vertical direction with a pixel Px to be interpolated, and are disposed on opposite sides of the pixel Px. If A1<A2<A3 or A1>A2>A3, differences S1=|D1−D6|, S2=|D2−D5|, and S3=|D3−D4| are calculated. If S1<S2<S3, an average value (D1+D6)/2 is used as interpolation data. If S1>S2>S3, an average value (D3+D4)/2 is used as interpolation data. In other cases, an average value (D2+D5)/2 is used as interpolation data.

9 Claims, 12 Drawing Sheets

| 0 | 100 | 0 |
|---|---|---|
|   | P |   |
| 0 | 95 | 0 |

METHOD OF PRINTING FULL-COLOR FRAME IMAGE REPRODUCED FROM FULL-COLOR FIELD IMAGE BY INTERPOLATION

BACKGROUND OF THE INVENTION

1. Field of the Invention

The present invention relates to a color video printing method for printing a full-color image by using a frame signal reproduced from a field signal.

2. Related Art

A video image, that is, a pictorial image picked up by a video camera, is constituted of a plurality of lines. For example, video images picked up by a TV camera may be classified into frame image each constituted of 525 lines and field images each constituted of 262.5 lines, half the number of the frame image lines. The frame image is superior in quality to the field image. However, many more memory locations are necessary for recording a frame signal, that is, a video signal for one frame. This is inconvenient particularly in an electronic still camera, because the number of recordable images decreases.

Therefore, it is desirable to record an image in the form of a field signal, that is, a video signal for one field, and print the image in the form of a frame image. Because the field image is constituted of lines half the number of those of the frame image, it is necessary to double the lines by interpolation. Conventionally, an average of image data of a pair of pixels which are adjacent in the vertical direction in the field image is utilized as image data of a pixel to be interpolated between the pair of pixels, this conventional interpolation method will be hereinafter referred to as a single-directional interpolation. However, the conventional interpolation method has a problem when it is applied to such a thermal video printer as shown in FIG. 13, whose thermal head 2 has an array of heating elements 3a, 3b ... aligned in a main scan direction (corresponding to the horizontal scanning direction of the video signal) and records images on a recording paper 5 in an area gradation method, such as disclosed in U.S. Pat. No. 5,232,294, while the recording paper 5 is moved in a sub scanning direction perpendicular to the main scanning direction relative to the thermal head 2.

In such a case, when the density of the image gradually changes, e.g., increases in the main scanning direction, jagged patterns as shown in FIG. 13 would be provided because the width of an interpolated line 6 would increase stepwise in a similar way as adjacent lines 7 and 8.

To avoid the above problem, an improved method has been known, for example, from JPA 63-187785, wherein three pairs of pixels are detected, which are disposed on opposite sides of a pixel to be interpolated and are aligned therewith in vertical and diagonal directions, respectively. Then, a difference of image data between the two pixels of each pair is determined, and is compared with one another. An average value of image data of one of the three pairs which has the smallest difference therebetween, is selected as the image data to be interpolated. This conventional interpolation method will be referred to as a conventional triple-directional interpolation.

However, according to the above-described conventional triple-directional interpolation, if all the pixels of both diagonal pairs which are disposed on diagonal opposite sides of a pixel P to be interpolated, have image data "0", image data of value "0" would be interpolated as image data of the pixel P, through the pixels of the vertically disposed pair having image data of remarkably larger values, e.g., "100" and "95", as is shown in FIG. 14. Obviously, interpolation of image data "0" in the location of the pixel P is unsuitable in the case shown in FIG. 14. Rather, it is desired interpolate the average value "97.5" of the data "100" and "95" for the pixel P. Therefore, the conventional triple-directional interpolation still has a problem in this respect.

SUMMARY OF THE INVENTION

In view of the foregoing, a primary object of the present invention is to provide a color video printing method wherein a field signal is converted into a frame signal while preventing occurrence of the jagged patterns and solving the above described problem.

Another object of the present invention is to provide a color video printing method which does not require a complicated construction for interpolation, nor require a long time.

To achieve the above objects, the present invention makes a triple-directional interpolation for at least one of the three primary colors of a color video signal, wherein a direction of arrangement of the pair of pixels whose image data is used for interpolation and which are disposed on opposite sides of a pixel to be interpolated, is selected among from the three, that is, vertical and diagonal directions, according to the following steps:

Sums A1, A2 and A3 of image data D1 and D4; D2 and D5; and D3 and D6 of respectively two pixels P1 and P4; P2 and P5; and P3 and P6 are calculated, assuming the pixels P1, P2 and P3 are aligned in this order in a main scanning line, and the pixels P4, P5 and P6 are aligned in this order in an adjacent main scanning line, and the pixels P2 and P5 are aligned in the vertical or sub scanning direction and are disposed on opposite sides of a pixel Px to be interpolated. If A1<A2<A3 or A1>A2>A3, differences S1, S2 and S3 of image data between two pixels of each of three pixel pairs which are aligned in the above-described three directions with the pixel Px, are calculated: S1=|D1−D6|, S2=|D2−D5|, S3=|D3−D4|. If S1<S2<S3, an average value of the image data D1 and D6 is used as image data of the pixel Px. If S1>S2>S3, an average value of the image data D3 and D4 is used as image data of the pixel Px. In other cases, an average value of the image data D2 and D5 is used as image data of the pixel Px.

According to the present invention, concerning at least a remaining one of the three primary colors, the single-directional interpolation is executed, wherein image data to be interpolated is always calculated as an average value of image data of those pixels which are vertically aligned with the pixel to be interpolated and are disposed on opposite sides of the pixel to be interpolated.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
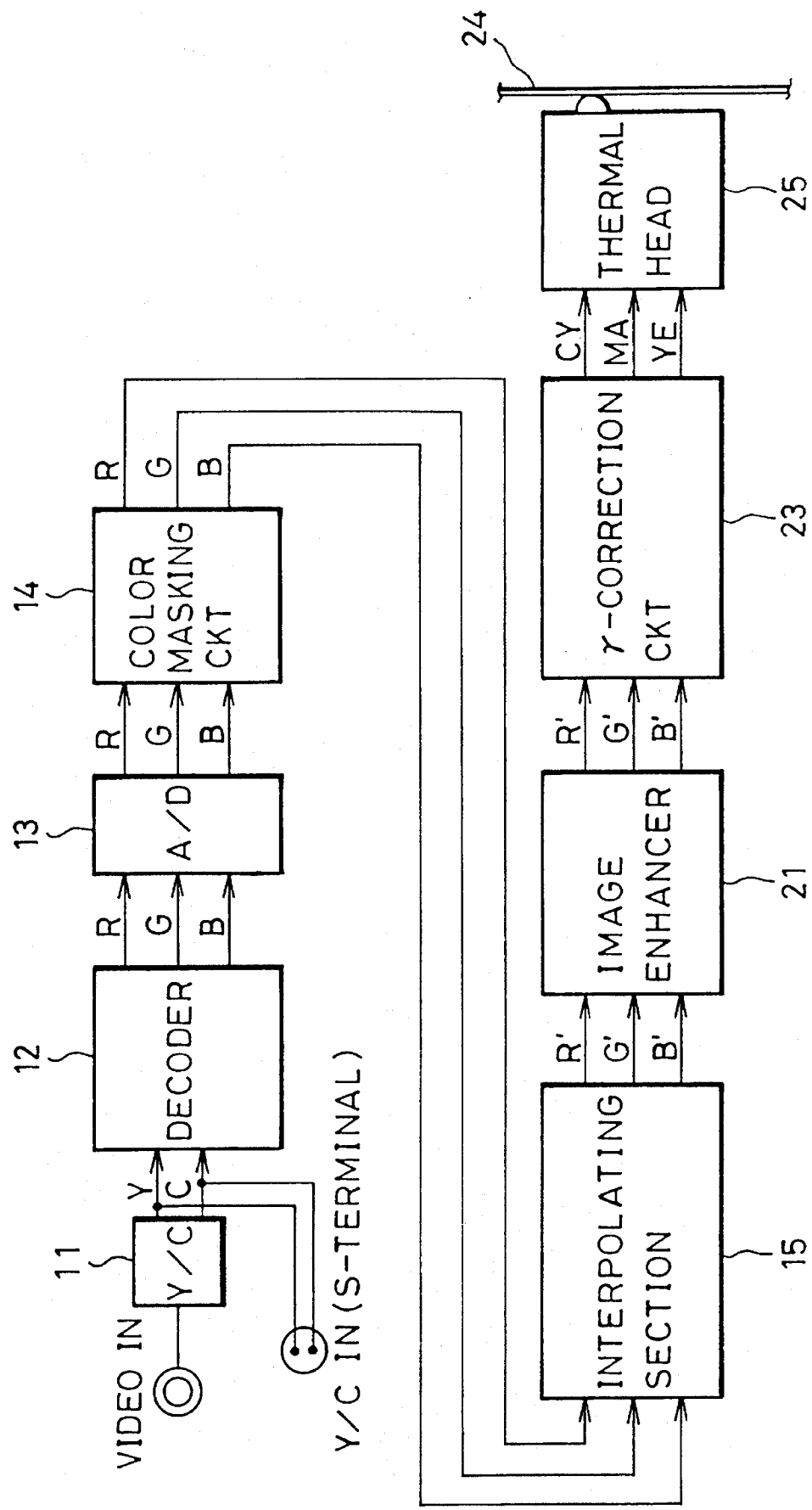
FIG. 1 is a block diagram of a thermal color video printer embodying an interpolation method of the present invention.

Referring to FIG. 1 showing the overall construction of an image data processing circuit of a thermal color video printer embodying a method of the present invention. A color video signal representing a field, which has been picked up, for example, by a video still camera and stored in a video floppy disc, and is read by a still video player, is inputted in a Y/C separation circuit 11 to be separated into a luminance signal Y and a chrominance signal C. Thereafter, the signals Y and C are converted into three primary color signals R, G and B through a decoder 12. If the video signal to be inputted into the video printer is already separated into the luminance signal Y and the chrominance signal C, the signals Y and C are inputted through a S-terminal connected to input terminals of the decoder 12.

The color signals R, G and B are respectively quantized through an A/D converter 13, to be converted into digital color data representing 64 density grades of each pixel of the three color separated fields. The digital color data R, G and B is color-corrected in a color masking circuit 14. Thereafter, the digital color data R, G and B is sent to an interpolating section 15, wherein the three color data of the field are processed into three color data for a frame by interpolation.

Figure 2:
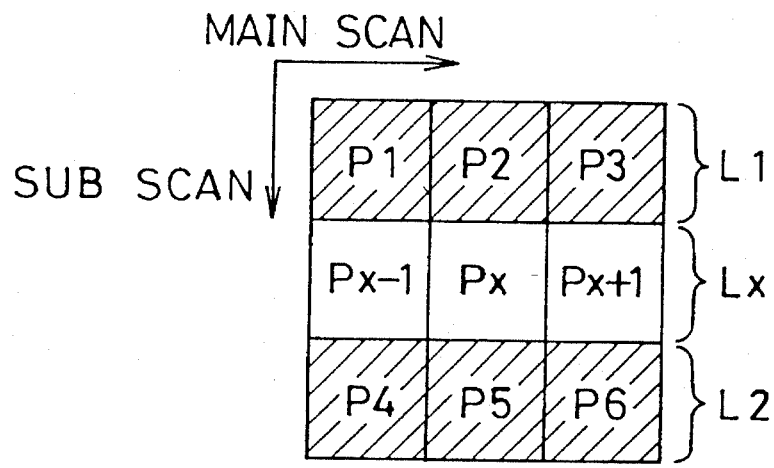
FIG. 2 is an explanatory view showing 3×3 pixels of a frame, for use in explaining the interpolation method of the invention.

FIG. 2 illustrates 3×3 pixels of a frame, wherein pixels P1, P2, P3; and P4, P5, P6 are components of two adjacent lines or main scanning lines L1 and L2 of a field, and Px, Px-1 and Px+1 represent pixels of a line Lx interpolated between the two lines L1 and L2. According to one embodiment the present invention, image data Dx of the pixel Px to be interpolated, hereinafter referred to as interpolation data Dx, is determined on the basis of image data D1, D2, D3, D4, D5 and D6, e.g., luminance data or color data, of the pixels P1, P2, P3, P4, P5 and P6, concerning at least one of three primary colors of the video signal, according to a triple-directional interpolation sequence as shown in FIG. 3.

Concerning the remaining colors of the video signal, interpolation data Dx is determined as an average value of the image data D2 and D5 of the pixels P2 and P5 which are disposed vertically above and below the pixel P, that is, the pixels which are aligned with the pixel Px in the vertical or sub scanning direction.

Figure 3:
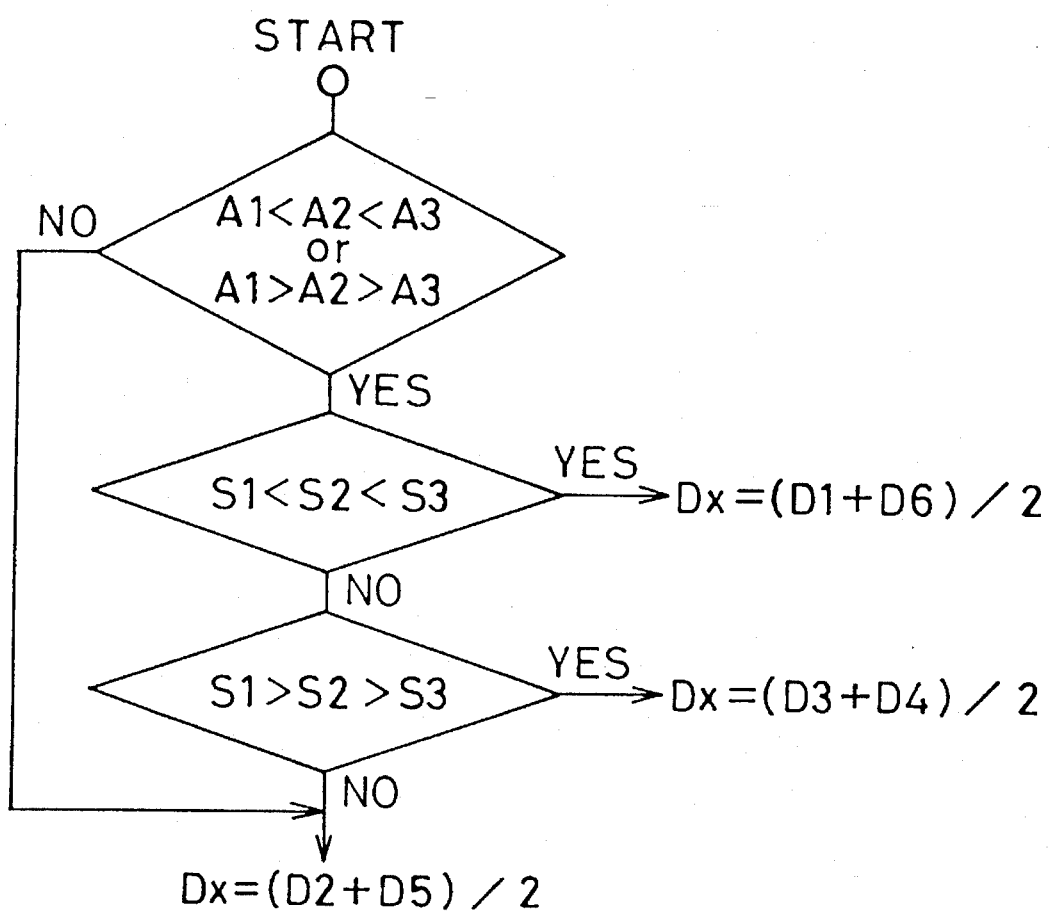
FIG. 3 is a flow chart of the interpolation method for an embodiment of the present invention.

Referring to FIG. 3, first, the image data D1, D2 and D3 of the pixels P1 to P3 of the first line L1 is respectively added to the image data D4, D5 and D6 of the pixels P4 to P6 of the second line L2, in pairs of two pixels P1 and P4; P2 and P5; and P3 and P6 which are aligned in the sub scanning direction:

A1=D1+D4

A2=D2+D5

A3=D3+D6

Figures 13, 14:
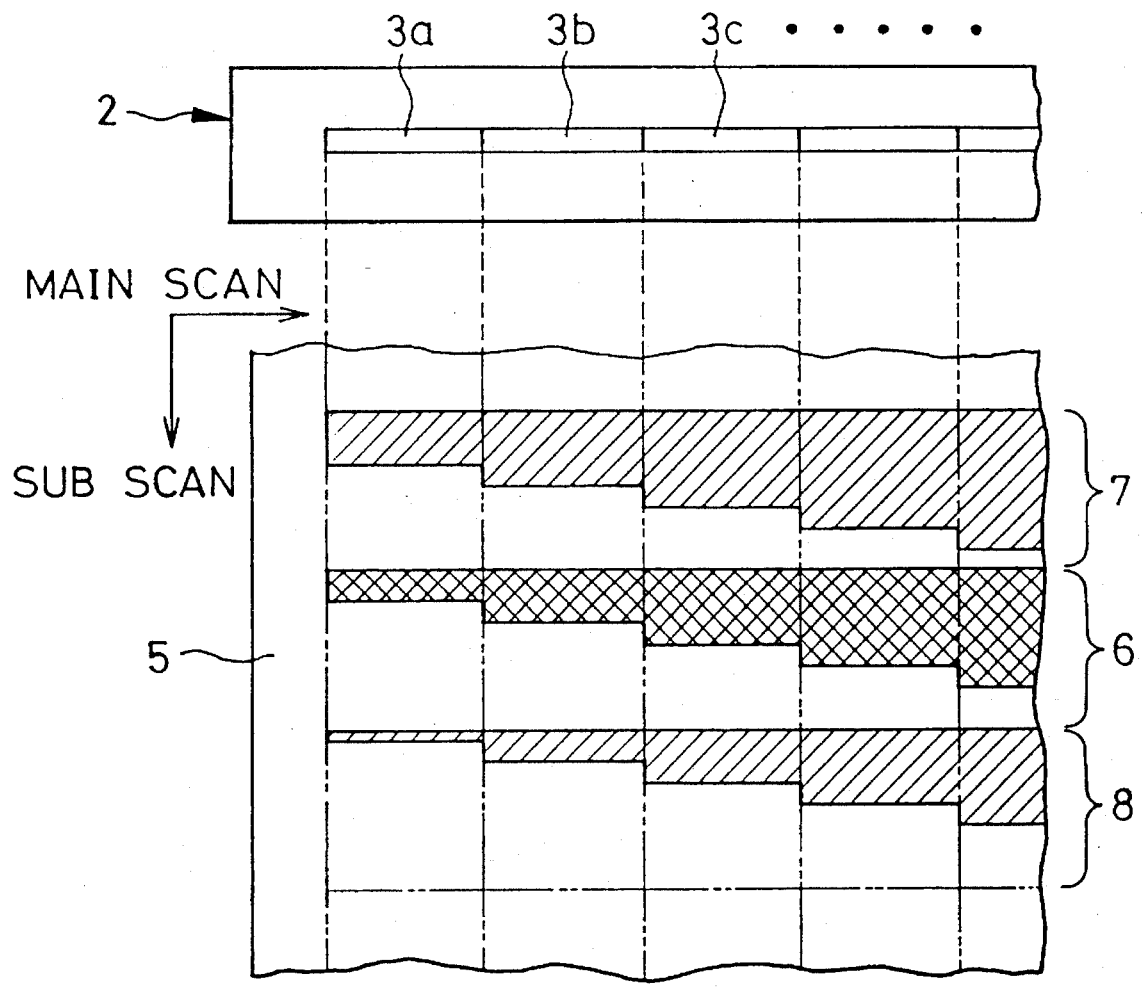
FIG. 13 is an explanatory view of a thermal head and jagged patterns produced according to a conventional interpolation method.
FIG. 14 is an explanatory view of image data of 3×3 pixels for explaining another conventional interpolation method.

Then, the order of magnitude of the sums A1 to A3 is detected. In case A1<A2<A3 or A1>A2>A3, jagged patterns as illustrated in FIG. 13 might be produced if the interpolation data Dx is calculated as the average value of the image data D2 and D5 of the pair of pixels P2 and P5 which are disposed vertically above and below the pixel Px. Therefore, in such a case, differences of the image data between two of the pixels P1 to P6 are calculated:

S1=|D1−D6|

S2=|D2−D5|

S3=|D3−D4| wherein, the pixels P1 and P6 of one pair are disposed diagonally above and below the pixel Px in a first diagonal direction, the pixels P2 and P5 of another pair are aligned with the pixel Px in the vertical or sub scanning direction, and the pixels P3 and P4 of a third pair are aligned with the pixel Px in a second diagonal direction.

Thereafter, the order of magnitude of the differences S1, S2 and S3 is detected. In case S1<S2<S3, interpolation data Dx is calculated as an average value of the image data D1 and D6. In case S1>S2>S3, interpolation data Dx is calculated as an average value of the image data D3 and D4. Namely, interpolation data Dx is determined as an average value of one pair of image data whose difference is the smallest.

In other cases, interpolation data Dx is calculated as the average value of the image data D2 and D5.

Figure 4:
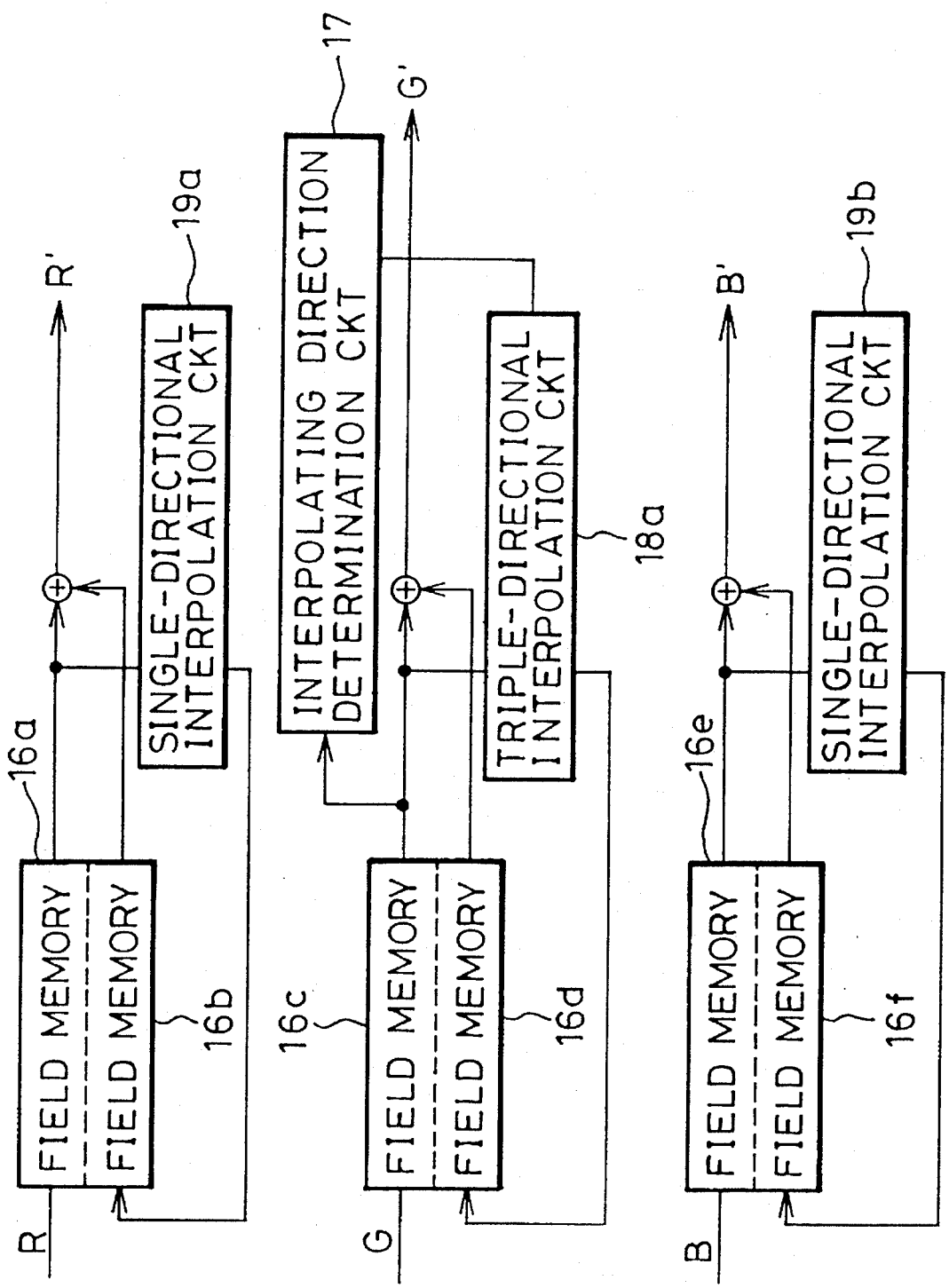
FIG. 4 is a block diagram showing an embodiment of the interpolating section of the video printer shown in FIG. 1.

FIG. 4 shows an embodiment of the interpolating section 15 of FIG. 1, wherein the digital color data R, G and B of the field is first stored in field memories 16a, 16c and 16e for each color. Then, the green field data G is read from the field memory 16c into an interpolating direction determination circuit 17 which determines according to the sequence shown in FIG. 3 one of the three interpolating directions, that is, the first and second diagonal directions and the vertical direction, in which a pair of pixels whose image data, that is, green color density data in this instance, is to be utilized for interpolation are aligned with the pixel Px to be interpolated.

If, for instance, the first diagonal direction is selected by the interpolating direction determination circuit 17, a triple-directional interpolation circuit 18a calculates interpolation data Dx according to the first equation Dx=(D1+D6)/2. If the second diagonal direction is selected by the interpolating direction determination circuit 17, the triple-direction interpolation circuit 18a calculates interpolation data Dx according to the second equation Dx=(D3+D4)/2. If the vertical direction is selected by the interpolating direction determination circuit 17, the triple-directional interpolation circuit 18a calculates interpolation data Dx according to the third equation Dx=(D2+D5)/2. Interpolation data for green thus calculated is written in a field memory 16d. Thereafter, the green field data and the interpolation data for green are simultaneously read from the field memories 16c and 16d and are composed into a green frame signal G' for a green frame. The green frame signal G' is inputted in an image enhancer 21.

In the image enhancer 21, the green frame signal G' is contoured through a spatial filter which may be represented, for example, by the following formula:

$$f(i,j) = \begin{pmatrix} 0 & -1 & 0 \\ -1 & 4 & -1 \\ 0 & -1 & 0 \end{pmatrix}$$

wherein, (i, j) represent coordinates of 3×3 pixels, and values in matrix represent densities of the spatial filter called Laplacian. Through this spatial filter, the density of a pixel to be contoured is multiplied by "4", and the densities of four pixels adjacent to the pixel to be contoured are multiplied by "−1", and these five multiplied values are added to determine image enhancement components, which are added to the original densities. After being thus contoured, the green frame data G' is inputted in a gamma correction circuit 23.

On the other hand, the red and blue field data R and B stored in the field memories 16a and 16e are respectively processed in single-directional interpolation circuits 19a and 19b, which always calculate interpolation data Dx according to the third equation Dx=(D2+D5)/2. Interpolation data for red and blue is written in field memories 16b and 16f, respectively. Then, the red field data R and the interpolation data for red are simultaneously read to be composed into a red frame signal R', which is contoured in the image enhancer 21 in the same way as for the green frame signal, and is sent to the gamma correction circuit 23. Also the blue field data B and the interpolation data for blue are simultaneously read to be composed into a blue frame signal B', which is contoured in the image enhancer 21 in the same way as for the green frame signal G', and is sent to the gamma correction circuit 23.

The gamma correction circuit 23 accomplishes gamma correction for each of the three color frame signals R', G' and B' in accordance with color developing properties of a thermosensitive color recording paper 24, so that the three color frame signals R', G' and B' are converted into magenta, yellow and cyan frame signals MA, YE and CY, respectively. A thermal head 25 is sequentially driven in accordance with the magenta, yellow and cyan frame signals MA, YE and CY. As conventionally, the thermal head 25 has a plurality of heating elements aligned in the main scanning direction.

Figure 5:
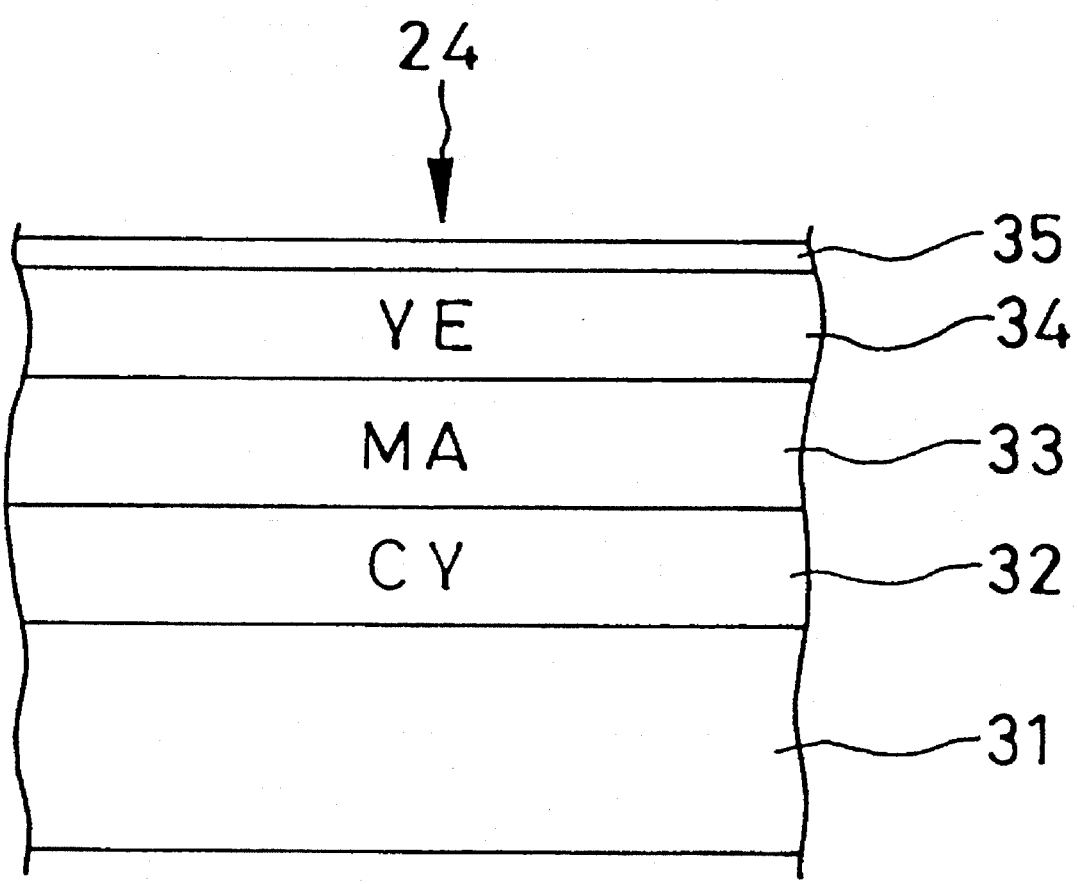
FIG. 5 is an explanatory view of the construction of a thermosensitive color recording paper.

The thermosensitive color recording paper 24 has a construction as shown in FIG. 5, wherein a cyan recording layer 32, a magenta recording layer 33 and a yellow recording layer 34 are formed on a base material 31 made of an opaque coating paper or plastic film in this order from the inside, and a protection layer 35 is formed on the outermost surface of the color recording layers 32 to 34. The thermal head 25 records three color frames on the corresponding color recording layers 32 to 34 in the order from the outside, that is, from yellow to cyan in this instance.

The cyan recording layer 32 contains an electron donating dye precursor and an electron accepting compound as main components, and is colored cyan when the cyan recording layer 32 is heated. The magenta recording layer 33 contains a diazonium salt compound having a maximum absorption factor at a wave length of about 360 nm and a coupler which acts upon the diazonium salt compound and is developed in magenta when the magenta recording layer 33 is heated. The magenta recording layer 33 loses its capacity of color-developing when exposed to electromagnetic or ultraviolet rays of about 360 nm, because the diazonium salt compound is photochemically decomposed by this range of rays. The yellow recording layer 34 contains a second diazonium salt compound having a maximum absorption factor at a wave length of about 420 nm and a coupler which acts upon the second diazonium salt compound and is colored in yellow when the yellow recording layer 34 is heated. The yellow recording layer 34 is also optically fixed, that is, loses its capacity of color-developing when exposed to near ultraviolet rays of about 420 nm.

Accordingly, the thermal head 25 is first driven by the yellow frame signal YE to record the yellow frame on the yellow recording layer 34 of the thermosensitive recording paper 24, and then the recording paper 24 is exposed to the near ultraviolet rays of about 420 nm to optically fix the yellow recording layer 34. Next, the thermal head 25 is driven by the magenta frame signal MA to record the magenta frame on the magenta recording layer 33. After the magenta recording layer 33 is optically fixed, the cyan frame is recorded on the cyan recording layer 32 in correspondence with the cyan frame signal.

Figure 6:
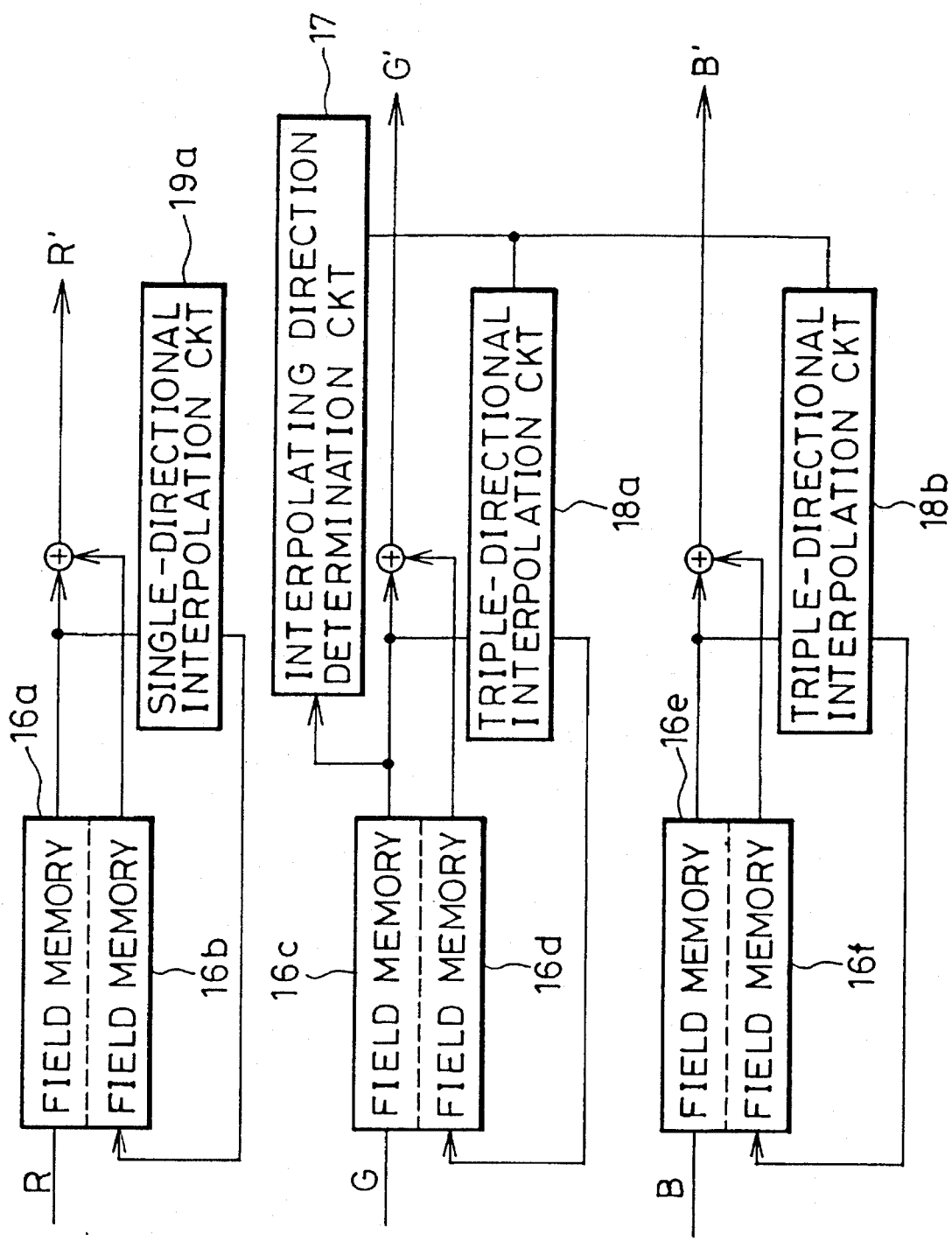
FIG. 6 is a block diagram showing another embodiment of the interpolating section of the video printer shown in FIG. 1.
Figure 7:
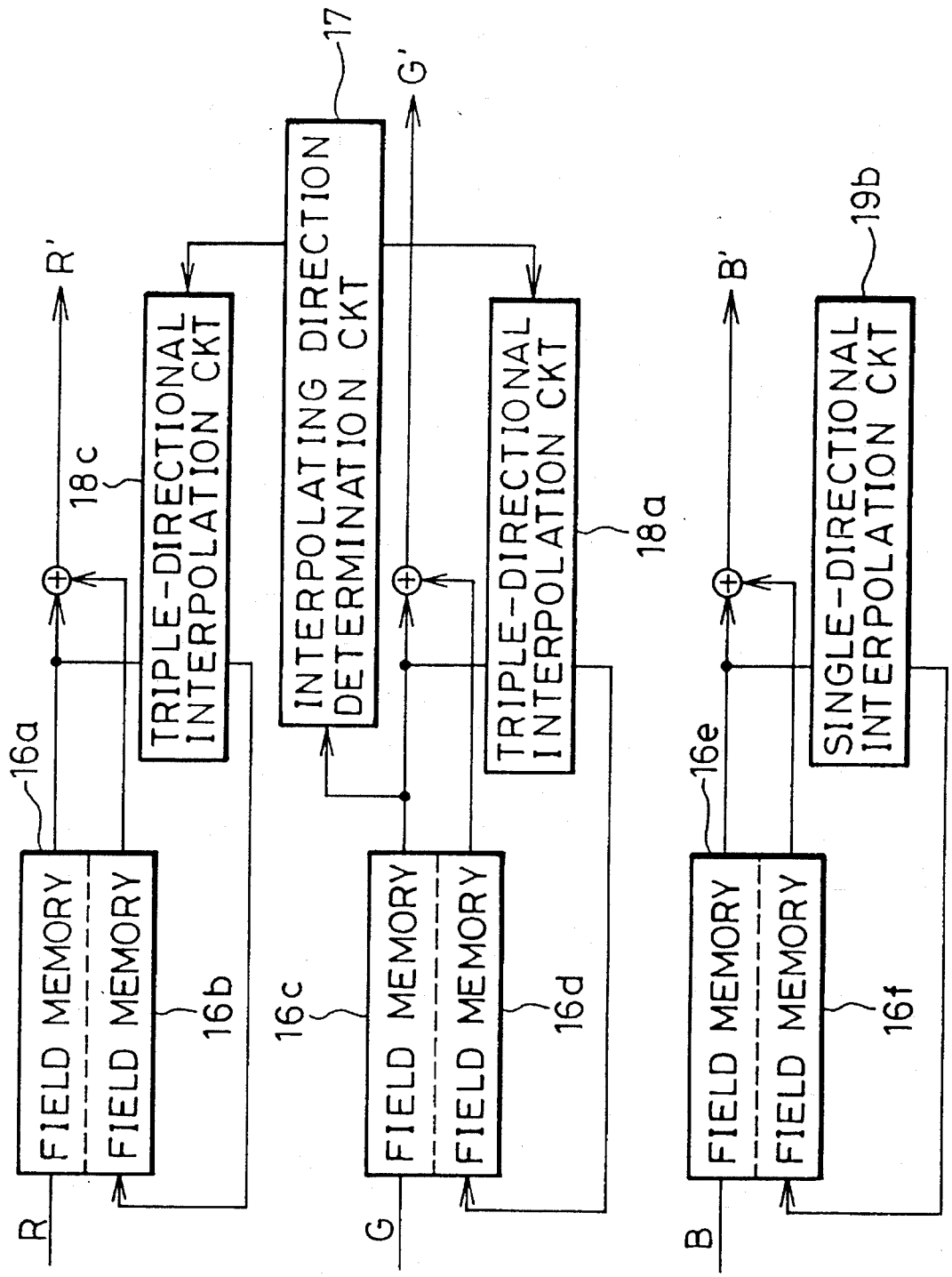
FIG. 7 is a block diagram showing a third embodiment of the interpolating section of the video printer shown in FIG. 1.

FIGS. 6 and 7 illustrate other embodiments of the interpolating section 15, wherein the triple-directional interpolation is applied to two of the three primary colors of the video signal. In the embodiment shown in FIG. 6, an interpolating direction determination circuit 17 determines one of the three interpolating directions on the basis of the green field data G according to the sequence shown in FIG. 3. The difference from the first embodiment is in that the triple-directional interpolation is applied not only to green data G but also to blue data B. Therefore, interpolation data for blue is calculated in a triple-directional interpolation circuit 18b according to the interpolating direction determined by the interpolating direction determination circuit 17. Interpolation data for red is calculated according to the third equation for interpolation. That is, interpolation data for red is calculated as an average value of two pixels of the red field which are disposed vertically on opposite sides of a pixel to be interpolated. Other constructions and operations may be identical to those of the embodiment shown in FIG. 4.

In the embodiment shown in FIG. 7, interpolation data for red as well as green is determined according to the triple-directional interpolation, while interpolation data for blue is calculated as an average value of pixels disposed in the vertical direction on opposite sides of the pixel to be interpolated. Therefore, a triple-directional interpolation circuit 18c calculates the interpolation data for red in accordance with the interpolating direction determined depending on the green field data by an interpolating direction determination circuit 17. Other constructions and operations may be identical to those of the embodiment shown in FIG. 4.

The triple-directional interpolation for the embodiments of the present invention prevents occurrence of the jagged patterns and reproduces a natural frame image based on a field image even when the field image has such an arrangement of pixels as shown in FIG. 14. Applying the triple-directional interpolation to merely one or two of the three primary colors simplifies the construction of the interpolating section and shortens the time required for interpolation, as compared with a case where the triple-directional interpolation is applied to all the three primary colors.

Figure 8:
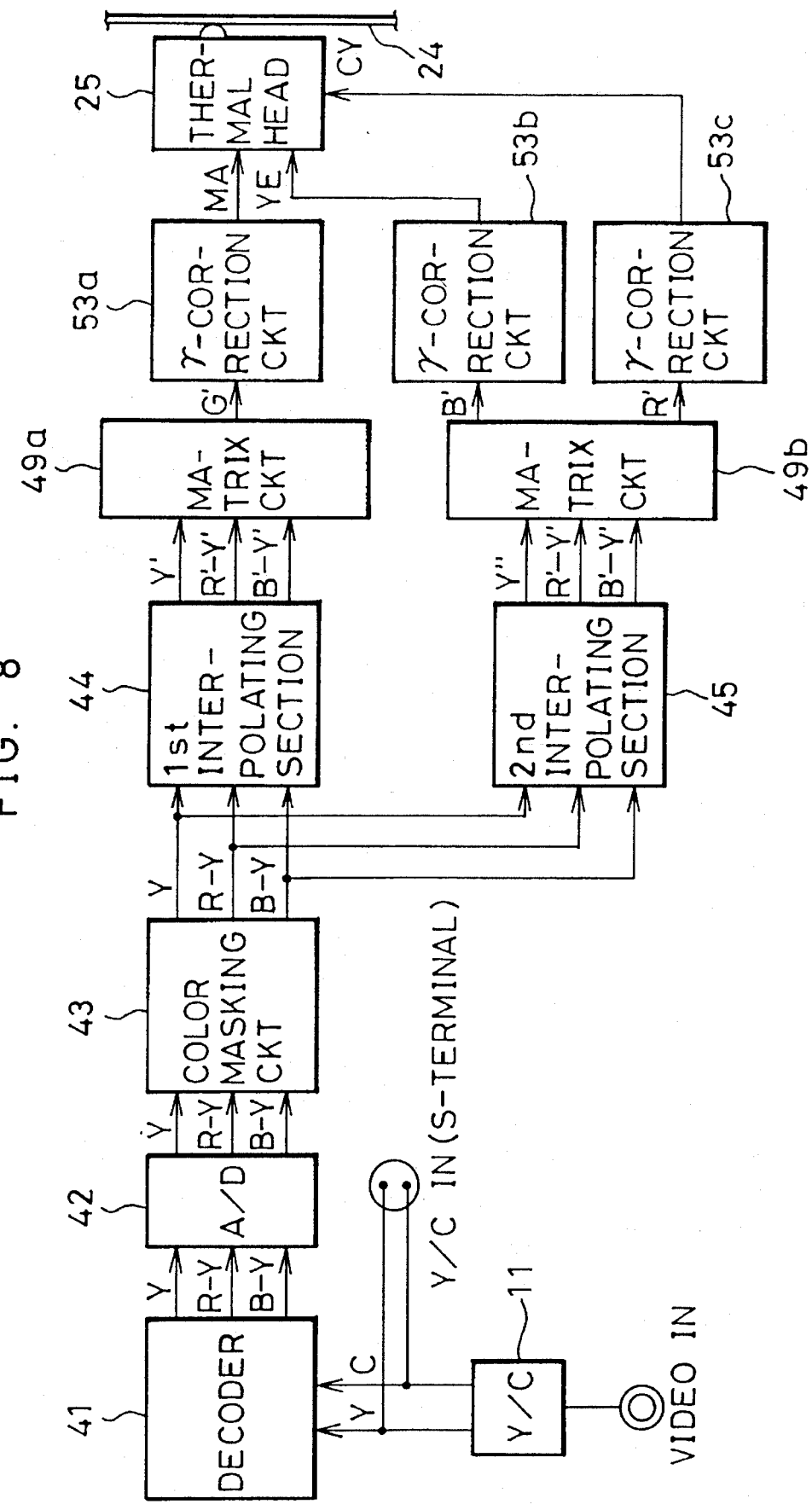
FIG. 8 is a block diagram showing a thermal color video printer according to another embodiment of the invention.

FIG. 8 shows a thermal color video printer according to another embodiment of the present invention, wherein interpolation is made with respect to a luminance signal Y and color difference signals R–Y and B–Y of a color video signal representing a field. The video signal is separated into the luminance signal Y and a chrominance signal C through a Y/C separation circuit 11, and the chrominance signal C is converted into the color difference signals R–Y and B–Y through a decoder 41. An A/D converter 42 quantizes these signals Y, R–Y and B–Y to convert them into digital data representing, for example, 64 density grades. The digital luminance data Y and the digital color difference data R–Y and B–Y is color-corrected in a color masking circuit 43.

Figure 9:
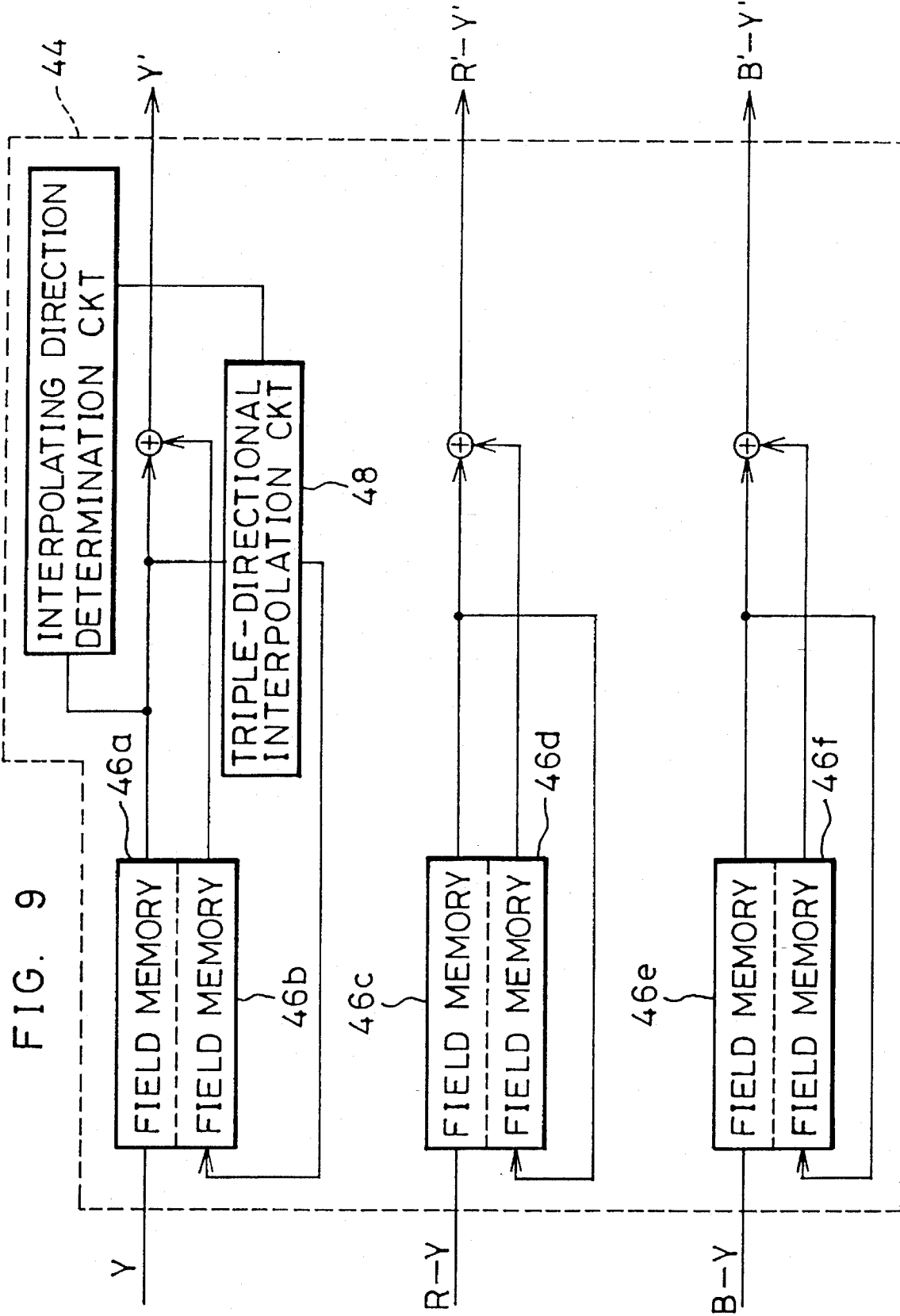
FIG. 9 is a block diagram showing the first interpolating section of the video printer shown in FIG. 8.

Then, all the luminance data Y and the color difference data R–Y and B–Y is inputted into both first and second interpolating sections 44 and 45. In the first interpolating section 44 as shown in FIG. 9, the field data Y, R–Y and B–Y are respectively stored in field memories 46a, 46c and 46e. Then, the luminance data Y is read from the field memory 46a into an interpolating direction determination circuit 47 which determines according to the sequence shown in FIG. 3 one of the three interpolating directions, that is, the first and second diagonal directions and the vertical direction.

Depending on the determined interpolating direction, a triple-directional interpolation circuit 48 calculates luminance data for lines to be interpolated, according to one of the above-described first to third equations for interpolation. The calculated luminance data is written in a field memory 46b as interpolation data. Thereafter, the luminance data Y stored in the field memory 46a and the interpolation data stored in the field memory 46b is simultaneously read and composed into luminance data Y' for a frame. The luminance data Y' is inputted in a matrix circuit 49a.

A field memory 46d is written with the same color difference data R–Y as stored in the field memory 46c, as color difference data of lines to be interpolated. The color difference data R–Y stored in the field memory 46c and the field memory 46d is simultaneously read and composed into color difference data R'–Y' for the frame. Also the color difference data R'–Y' is inputted in the matrix circuit 49a. A field memory 46f is written with the same color difference data B–Y as stored in the field memory 46e, as color difference data of lines to be interpolated. The color difference data B–Y stored in the field memory 46e and the field memory 46f is simultaneously read and composed into color difference data B'–Y' for the frame. The color difference data B'–Y' is also inputted in the matrix circuit 49a.

Figure 10:
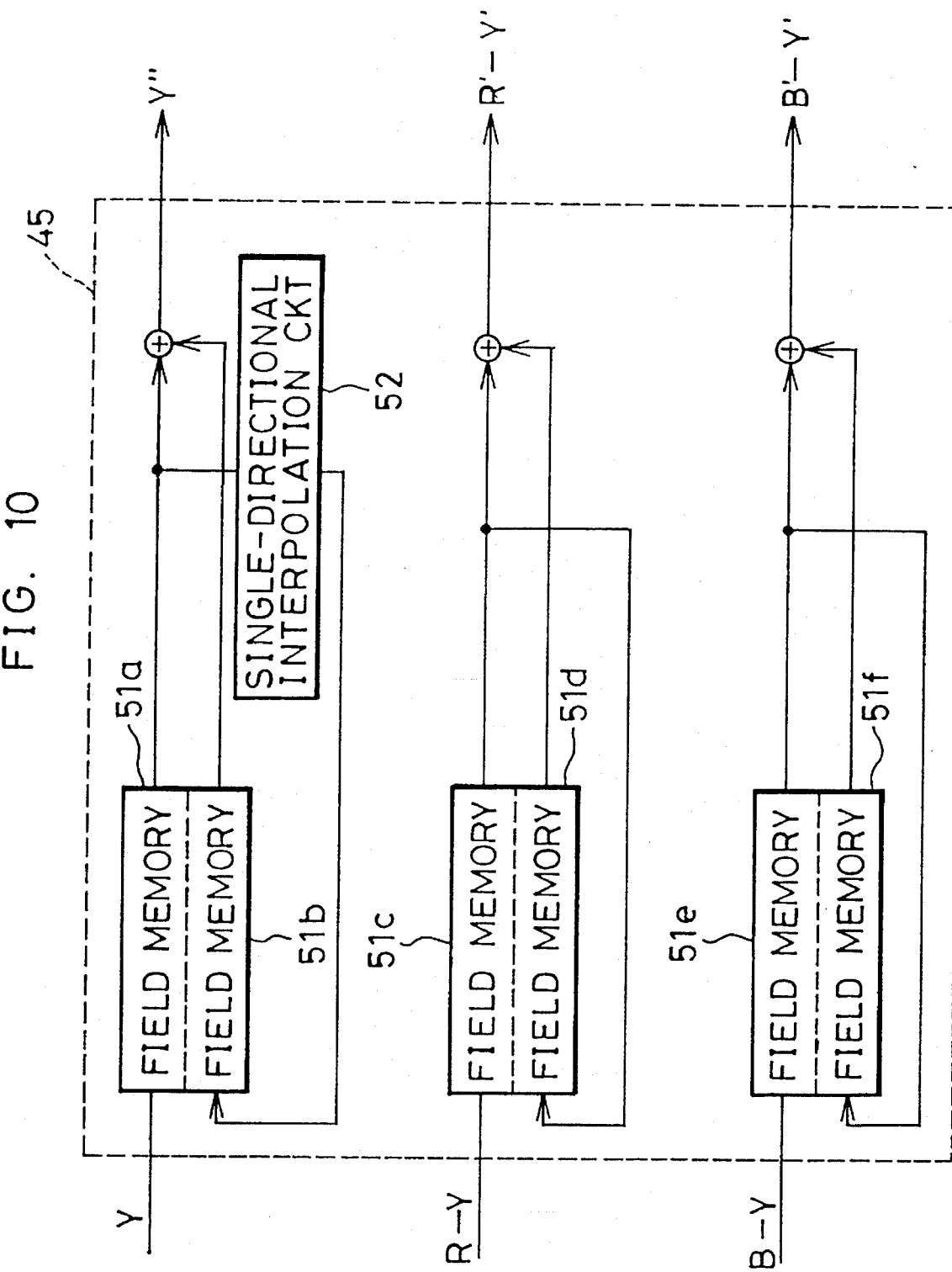
FIG. 10 is a block diagram showing the second interpolating section of the video printer shown in FIG. 9.

In the second interpolating section 45 as shown in FIG. 10, the field data Y, R–Y and B–Y are respectively stored in field memories 51a, 51c and 51e. Then, the luminance data Y is read from the field memory 51a into a single-directional interpolation circuit 52 which calculates luminance data for lines to be interpolated, according to the third equation for interpolation: $D_x=(D_2+D_5)/2$. The calculated luminance data is written in a field memory 51b. Thereafter, the luminance data Y stored in the field memory 51a and the calculated luminance data stored the field memory 51b is simultaneously read and composed into luminance data Y" for the frame. The luminance data Y" is inputted in a matrix circuit 49b.

Field memories 51d and 51f are written with the same color difference data R–Y and B–Y as stored in the field memories 51c and 51e, respectively, as interpolation data. The color difference data R–Y stored in the field memory 51c and the field memory 51d is simultaneously read and composed into color difference data R'–Y' for the frame. Also the color difference data R'–Y' is inputted in the matrix circuit 49b. The color difference data B–Y stored in the field memory 51e and the field memory 51f is simultaneously read and composed into color difference data B'–Y' for the frame. Also the color difference data B'–Y' is inputted in the matrix circuit 49b.

The matrix circuit 49a converts the luminance data Y' and the color difference data R'–Y' and B'–Y' into a green frame signal G'. The green frame signal G' is converted into a magenta frame signal MA through a gamma-correction circuit 53a which accomplishes gamma-correction in accordance with color developing properties of a thermosensitive color recording paper 24. The matrix circuit 49b converts the luminance data Y" and the color difference data R'–Y' and B'–Y' into blue and red frame signals B' and R'. The blue signal B' is converted into a yellow frame signal YE through a gamma-correction circuit 53b. The red signal R' is converted into a cyan frame signal CY through a gamma-correction circuit 53c. Also the gamma-correction circuits 53b and 53c accomplish gamma-correction in accordance with color developing properties of the thermosensitive color recording paper 24. Depending on these yellow, magenta and cyan signals YE, MA and CY, a thermal head 25 is driven in the same manner as described above.

The relationships between the luminance signal Y and the color difference signals R–Y and B–Y, on one hand, and the three primary color signals R, G and B, on the other hand, are represented by the following known equations:

$Y=0.3R+0.59G+0.11B$ $R-Y=0.7R-0.59G-0.11B$ $B-Y=-0.3R-0.59G+0.89B$

Figure 11:
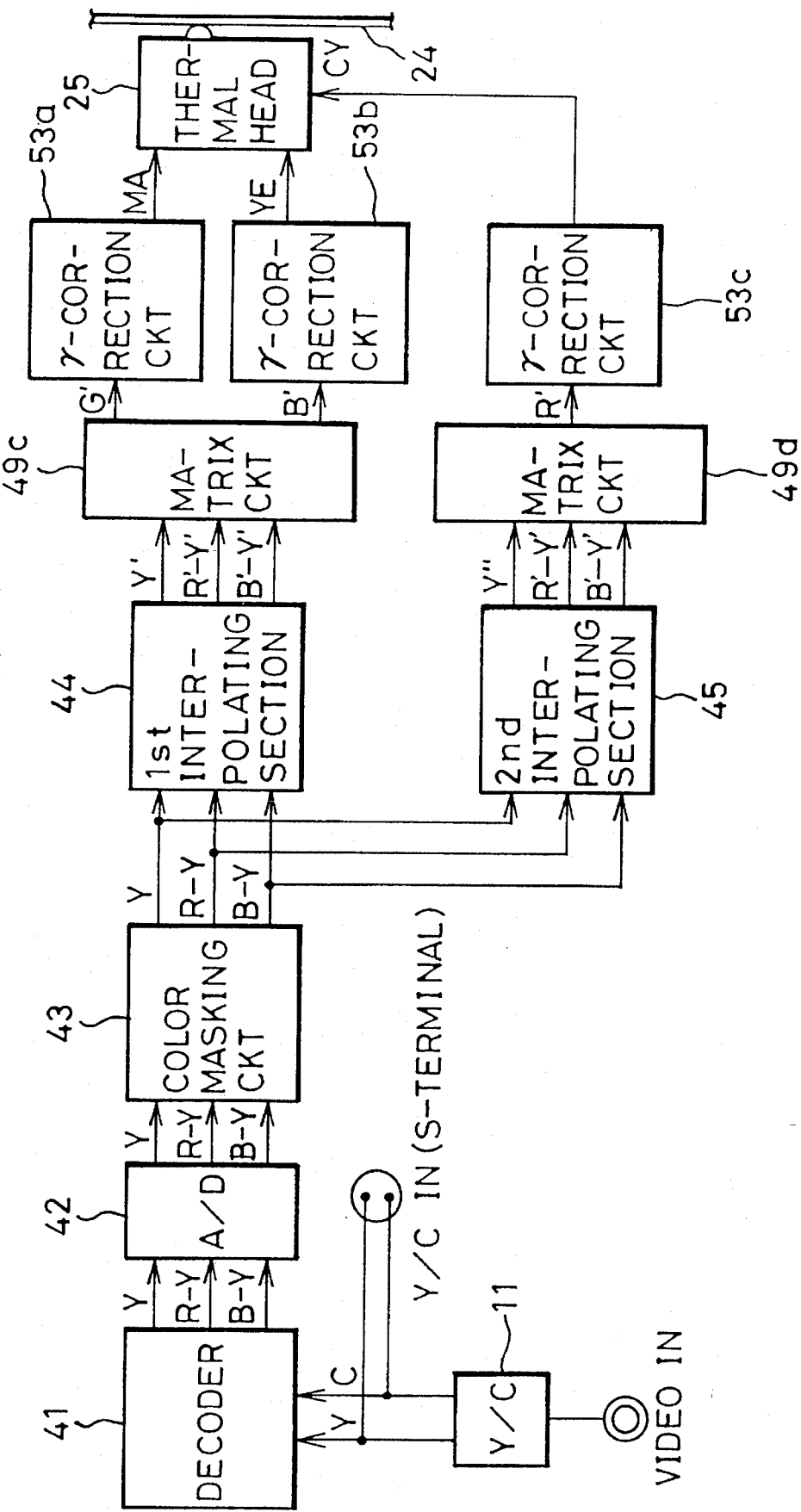
FIG. 11 is a block diagram showing a thermal color video printer according to another embodiment of the invention.

FIG. 11 shows a modification of the embodiment shown in FIG. 8, wherein the luminance data Y' and the color difference data R'–Y' and B'–Y' for one frame, which is generated from the first interpolating section 44, is converted into green and blue frame signals through a matrix circuit 49c, while the luminance data Y" and the color difference data R'–Y' and B'–Y' for one frame, which is generated from the second interpolating section 45, is converted into a red frame signal through a matrix circuit 49d.

Figure 12:
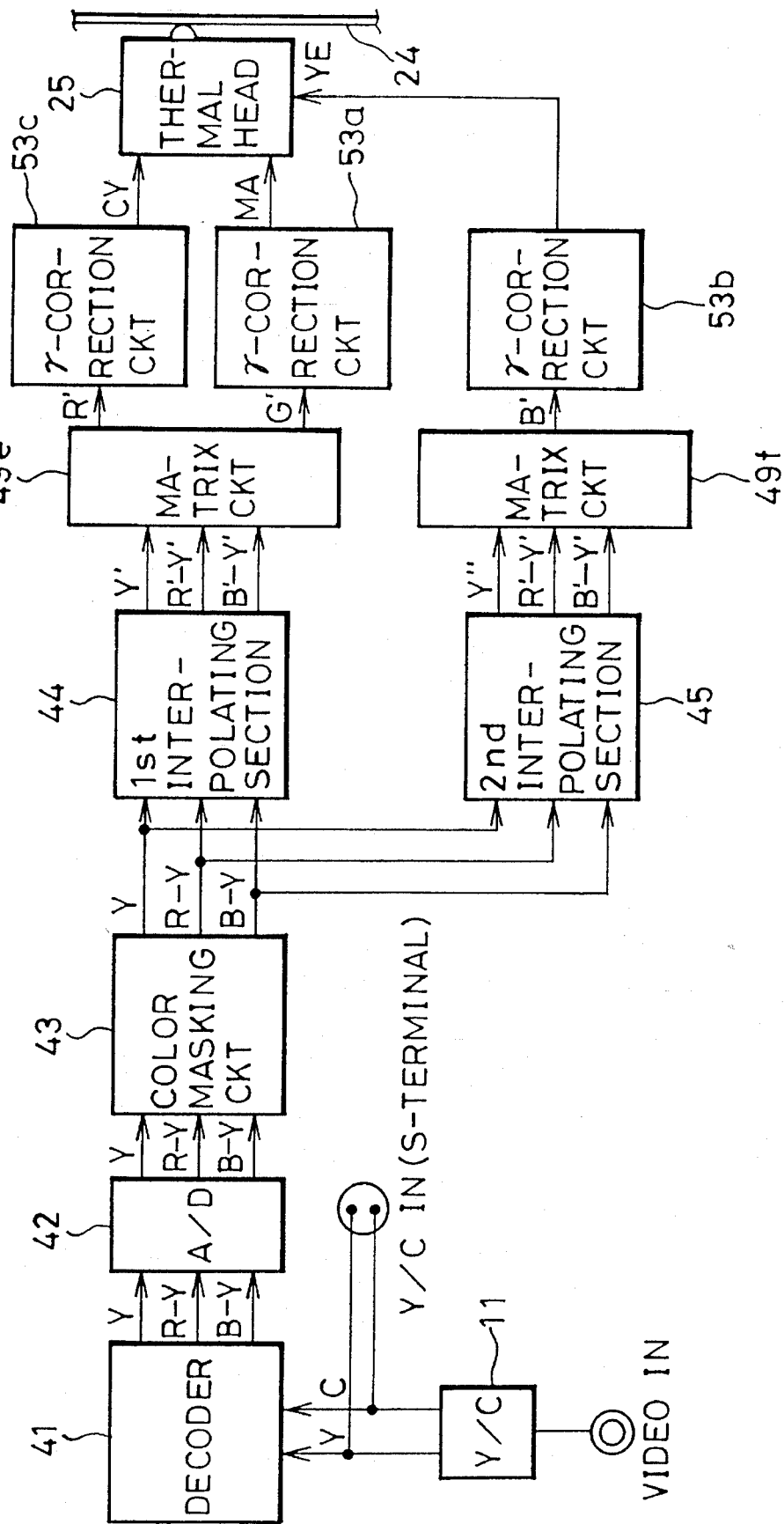
FIG. 12 is a block diagram showing a thermal color video printer according to a further embodiment of the invention.

FIG. 12 shows another modification of the embodiment shown in FIG. 8, wherein the luminance data Y' and the color difference data R'–Y' and B'–Y' for one frame, which is generated from the first interpolating section 44, is converted into green and red frame signals through a matrix circuit 49e, while the luminance data Y" and the color difference data R'–Y' and B'–Y' for one frame, which is generated from the second interpolating section 45, is converted into a blue frame signal through a matrix circuit 49f.

The three primary color frame signals G', B' and R' are converted into magenta, yellow and cyan frame signals MA, YE and CY through the matrix circuits 53a, 53b and 53c, respectively, in the same way as in the embodiment shown in FIG. 10.

Although the above described embodiments only relate to a direct color thermal line printer using a thermosensitive color recording paper, the embodiments of the present invention may be applicable to another type of printer, such as a serial printer, a thermal transfer printer using an ink film, or an ink jet printer.

It is also possible to accomplish the interpolation with respect to the yellow, magenta and cyan signals.

Thus, the present invention should not be limited by the above described embodiments but, on the contrary, various modifications of the present invention can be effected without departing from the spirit and scope of the appended claims.

What is claimed is:

1. A method for recreating and printing a full-color frame image based on an original full-color field image by interpolating a line between adjacent first and second lines of said original full-color field image, full-color image data of a predetermined pixel to be interpolated being determined according to the steps of:

(A) calculating first, second and third sums of first and fourth full-color image data; second and fifth full-color image data; and third and sixth full-color image data for each of two pixels respectively corresponding to first and fourth pixels; second and fifth pixels; and third and sixth pixels, assuming said first, second and third pixels are aligned in this order in said first line of said full-color field image, and said fourth, fifth and sixth pixels are aligned in this order in said second line of said full-color field image, and said second and fifth pixels are aligned with said predetermined pixel in a vertical direction and are disposed on opposite sides of said predetermined pixel to be interpolated;

(B) calculating, if said first sum<said second sum<said third sum or said first sum>said second sum>said third sum, first, second and third differences of said full-color image data between two pixels of each pair of said first and fourth pixels, said second and fifth pixels and said third and sixth pixels which are aligned in three directions with said predetermined pixel, wherein said first difference=|said first–said sixth full-color image data|, said second difference=|said second–said fifth full-color image data|, and said third difference=|said third–fourth full-color image data|;

(C) selecting, if said first difference<said second difference<said third difference, an average value of said first and sixth full-color image data as the full-color image data of said predetermined pixel to be interpolated;

(D) selecting, if said first difference>said second difference>said third difference, an average value of said third and fourth image data as the full-color image data of said predetermined pixel to be interpolated; and (E) selecting, in other cases, an average value of said second and fifth image data as the full-color image data of said predetermined pixel to be interpolated.

2. A color video printing method as recited in claim 1, wherein said full-color image data includes at least three primary color data, and said interpolation steps (A) to (E) are made for at least one color of said three primary color data.

3. A color video printing method as recited in claim 2, further including a second interpolation sequence for at least a remaining one color of the three primary color data, the second interpolation sequence comprising the step of:

(a) calculating data of said remaining one color of the three primary color data to be interpolated as an average value of data of said remaining one color of the three primary color data of pixels of said field image which are vertically aligned with and are disposed on opposite sides of said predetermined pixel to be interpolated.

4. A color video printing method as recited in claim 3, wherein said interpolation steps (A) to (E) are made on luminance signals, and further comprising the step of:

(F) deriving said three primary color data from said luminance signals and color difference signals.

5. A color video printing method for recreating and printing a full-color frame image based on an original full-color field image by interpolating lines between two adjacent lines of said original full-color field image, comprising the steps of:

(A) calculating data of a first one of three primary colors to be interpolated for a first pixel as an average value of data of a first color of one of three pairs of pixels of said two adjacent lines, said three pairs of pixels including a vertical pair of pixels having pixels disposed on opposite sides of said first pixel in a vertical direction, a first diagonal pair having pixels disposed on opposite sides of said first pixel in a first diagonal direction, and a second diagonal pair having pixels disposed on opposite sides of said first pixel in a second diagonal direction; and (B) selecting said one of said three pairs, said step (B) including steps of, (B)(1) adding said first color data of the two pixels of said vertical pair to obtain a first sum, (B)(2) adding said first color data of two pixels of the remaining four pixels of said three pairs of pixels, said two pixels of the remaining four pixels being aligned in the vertical direction with each other, to obtain second and third sums, (B)(3) comparing said first, second and third sums with one another, (B)(4) calculating a difference between said first color data of the two pixels of each of said three pairs of pixels, if the first sum is a middle value of the first, second and third sums, (B)(5) selecting said first diagonal pair for calculating said first color data of said first pixel, if the data difference between the two pixels of said vertical pair is a middle value of the three data differences, and the data difference between the two pixels of said first diagonal pair is the smallest, (B)(6) selecting said second diagonal pair for calculating said first color data of said first pixel, if the data difference between the two pixels of said vertical pair is a middle value of the three data differences, and the data difference between the two pixels of said second diagonal pair is the smallest, and (B)(7) selecting said vertical pair for calculating said first color data of said first pixel, if the first sum fails to be the middle value of the first, second and third sums, or if the data difference between the two pixels of said vertical pair fails to be the middle value of the three data differences.

6. A color video thermal printer for recreating and printing a full-color frame image based on an original full-color field image by interpolating a line between adjacent first and second lines of said original full-color field image by determining full-color image data of a predetermined pixel to be interpolated, comprising:

first calculating means for calculating first, second and third sums of first and fourth full-color image data; second and fifth full-color image data; and third and sixth full-color image data for each of two pixels respectively corresponding to first and fourth pixels; second and fifth pixels; and third and sixth pixels, assuming said first, second and third pixels are aligned in this order in said first line of said full-color field image, and said fourth, fifth and sixth pixels are aligned in this order in said second line of said full-color field image, and said second and fifth pixels are aligned with said predetermined pixel in a vertical direction and are disposed on opposite sides of said predetermined pixel to be interpolated;

second calculating means for calculating, if said first sum<said second sum<said third sum or said first sum>said second sum>said third sum, first, second and third differences of said full-color image data between two pixels of each pair of said first and fourth pixels, said second and fifth pixels and said third and sixth pixels which are aligned in three directions with said predetermined pixels, wherein said first difference=|said first−said sixth full-color image data|, said second difference=|said second−said fifth full-color image data|, and said third difference=|said third−said fourth full-color image data|;

first selecting means for selecting, if said first difference<said second difference<said third difference, an average value of said first and sixth full-color image data as the full-color image data of said predetermined pixel to be interpolated;

second selecting means for selecting, if said first difference>said second difference>said third difference, an average value of said third and fourth image data as the full-color image data of said predetermined pixel to be interpolated; and third selecting means for selecting, in other cases, an average value of said second and fifth image data as the full-color image data of said predetermined pixel to be interpolated.

7. The color video thermal printer of claim 6, further comprising:

means for producing first, second and third printer signals based on the pixels of the adjacent lines of said original full-color field image and on the interpolated pixels; and a thermal printer head, responsive to said first, second, and third printer signals, for printing the recreated full-color frame image.

8. The method of claim 1, further comprising the steps of:

(F) producing printer signals based on the pixels of the first and second lines of said original full-color field image and on the interpolated pixels of the interpolated line, the printer signals representing the recreated full-color frame image; and (G) printing the recreated full-color frame image in accordance with the printer signals.

9. The method of claim 5, further comprising the steps of:

(C) generating a plurality of printer signals based on the pixels of the adjacent lines of said original full-color field image and on the pixels of the interpolated lines, the printer signals representing the recreated full-color frame image; and (D) printing the recreated full-color frame image in accordance with the plurality of printer signals.

\* \* \* \* \*